(12) United States Patent
Filippi et al.

(10) Patent No.: US 10,954,124 B2
(45) Date of Patent: Mar. 23, 2021

(54) PROCESS FOR PRODUCING AMMONIA SYNTHESIS GAS AND A METHOD FOR REVAMPING A FRONT-END OF AN AMMONIA PLANT

(71) Applicant: Casale SA, Lugano (CH)

(72) Inventors: Ermanno Filippi, Castagnola (CH); Raffaele Ostuni, Lugano (CH)

(73) Assignee: Casale SA, Lugano (CH)

( * ) Notice: Subject to any disclaimer, the term of this patent is extended or adjusted under 35 U.S.C. 154(b) by 0 days.

(21) Appl. No.: 15/035,151

(22) PCT Filed: Oct. 13, 2014

(86) PCT No.: PCT/EP2014/071866
§ 371 (c)(1),
(2) Date: May 6, 2016

(87) PCT Pub. No.: WO2015/067436
PCT Pub. Date: May 14, 2015

(65) Prior Publication Data
US 2016/0264411 A1 Sep. 15, 2016

Related U.S. Application Data

(63) Continuation of application No. 14/074,962, filed on Nov. 8, 2013, now abandoned.

(51) Int. Cl.
*B01J 19/00* (2006.01)
*C01B 3/38* (2006.01)
(Continued)

(52) U.S. Cl.
CPC .................. *C01B 3/025* (2013.01); *B01J 7/00* (2013.01); *C01B 3/26* (2013.01); *C01B 3/382* (2013.01);
(Continued)

(58) Field of Classification Search
CPC ...... Y02P 20/128; Y02P 20/52; Y02P 20/132; C01B 2203/141; C01B 2203/0475;
(Continued)

(56) References Cited

U.S. PATENT DOCUMENTS 3,543,648 A 12/1970 Stahle
4,372,920 A 2/1983 Zardi
(Continued)

FOREIGN PATENT DOCUMENTS

EP 2172417 A1 4/2010
EP 2292554 A1 3/2011
EP 2404869 A1 1/2012

OTHER PUBLICATIONS

International Search Report issued in connection with PCT/EP2014/071866.
(Continued)

*Primary Examiner* — Anthony J Zimmer
*Assistant Examiner* — Syed T Iqbal
(74) *Attorney, Agent, or Firm* — Akerman LLP

(57) ABSTRACT

A process for producing ammonia make-up synthesis gas and a procedure for revamping a front-end of an ammonia plant for producing ammonia make-up synthesis gas are disclosed, wherein the make-up synthesis gas is produced by means of steam reforming of a hydrocarbon gaseous feedstock; said front-end includes a primary reformer, a secondary reformer, a shift conversion section, a CO2 removal section and optionally a methanation section; a shell-and-tube gas-heated reformer is installed after said secondary reformer, and a portion of the available feedstock is reformed in the tubes of said gas-heated reformer, and heat is provided to the shell side of said gas-heated reformer by
(Continued)

at least a portion of product gas leaving the secondary reformer, possibly mixed with product gas leaving the tubes of said gas-heated reformer.

18 Claims, 2 Drawing Sheets

(51) Int. Cl.
    *C01B 3/02*             (2006.01)
    *C01B 13/02*           (2006.01)
    *C01C 1/04*             (2006.01)
    *C01B 3/26*             (2006.01)
    *B01J 7/00*             (2006.01)
    *C01B 3/48*             (2006.01)
    *C01B 3/50*             (2006.01)

(52) U.S. Cl.
    CPC .................. *C01B 3/48* (2013.01); *C01B 3/50* (2013.01); *C01B 13/0229* (2013.01); *C01C 1/0405* (2013.01); *B01J 2219/00024* (2013.01); *C01B 2203/0205* (2013.01); *C01B 2203/0233* (2013.01); *C01B 2203/0244* (2013.01); *C01B 2203/0283* (2013.01); *C01B 2203/043* (2013.01); *C01B 2203/0445* (2013.01); *C01B 2203/0475* (2013.01); *C01B 2203/068* (2013.01); *C01B 2203/0844* (2013.01); *C01B 2203/1235* (2013.01); *C01B 2203/141* (2013.01); *C01B 2203/142* (2013.01); *C01B 2210/0046* (2013.01); *Y02P 20/52* (2015.11); *Y10T 29/49716* (2015.01)

(58) Field of Classification Search
    CPC .... C01B 2203/0244; C01B 2203/0822; C01B 2203/148; C01B 3/384; C01B 2203/0894; C01B 3/48; C01B 3/382; C01B 2203/1288; C01B 2203/0445; C01B 2203/0405; C01B 2203/142; C01B 2203/146; C01B 2203/0495; C01B 2203/147; C01B 2203/068; C01B 2203/047; C01B 2203/0415; C01B 2203/0816; C01B 2203/0844; C01B 3/025; C01B 2203/0233; C01B 2203/0283; C01B 2203/84; C01B 2203/1604; B01J 2219/0004; B01J 8/04; B01J 2208/0053; B01J 2219/00006; C01C 1/0476; C01C 1/0441; C01C 1/0405

See application file for complete search history.

(56) References Cited

U.S. PATENT DOCUMENTS

| | | | |
|---|---|---|---|
| 4,695,442 A | 9/1987 | Pinto et al. | |
| 5,180,570 A | 1/1993 | Lee et al. | |
| 6,171,570 B1* | 1/2001 | Czuppon | C01C 1/0405 422/148 |
| 2011/0042620 A1* | 2/2011 | Singh | B01J 8/04 252/373 |
| 2012/0161079 A1* | 6/2012 | Filippi | C01B 3/025 252/374 |

OTHER PUBLICATIONS

International Preliminary Report on Patentability issued in connection with PCT/EP2014/071866.

* cited by examiner

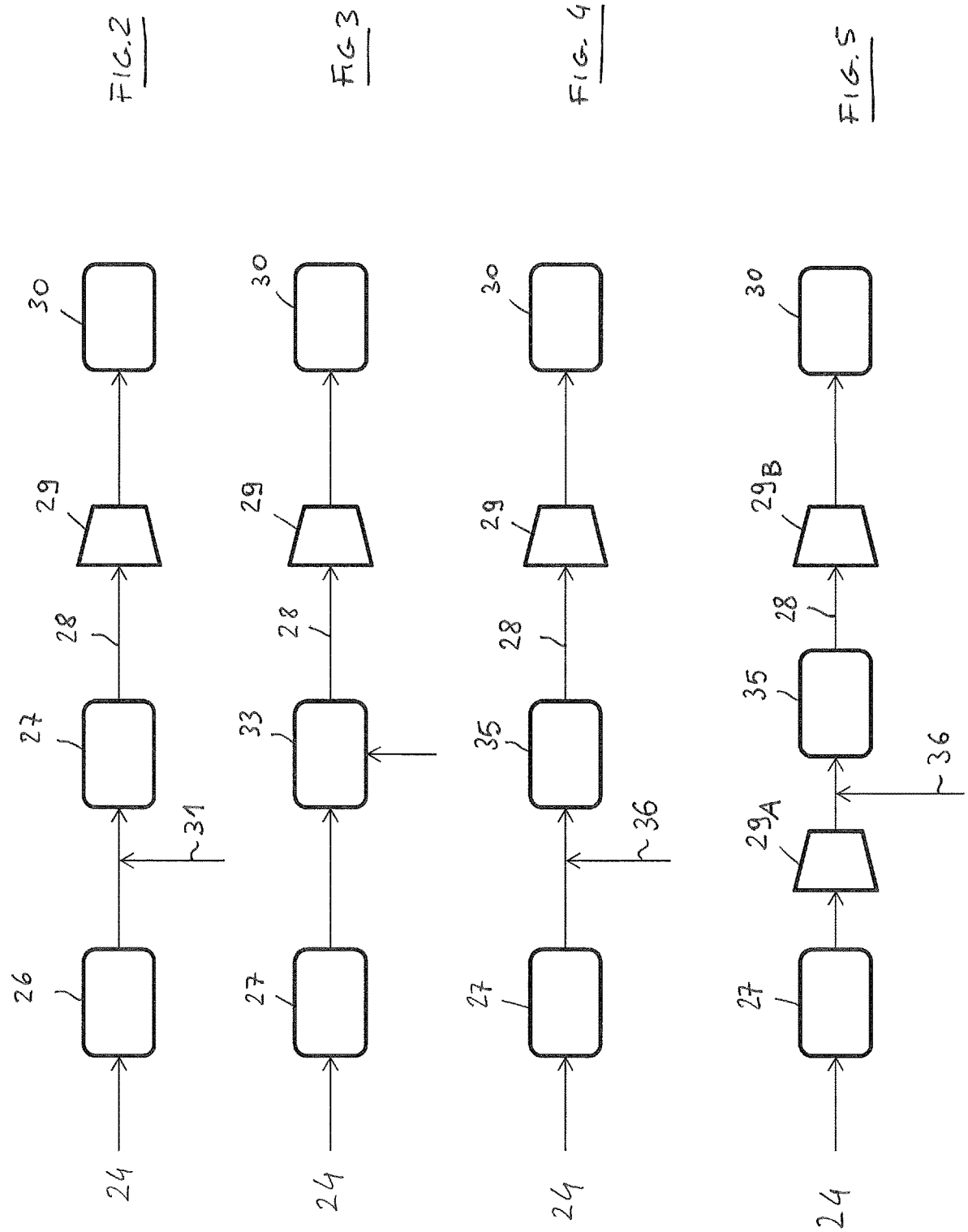

PROCESS FOR PRODUCING AMMONIA SYNTHESIS GAS AND A METHOD FOR REVAMPING A FRONT-END OF AN AMMONIA PLANT

This application is a national phase of PCT/EP2014/071866, filed Oct. 13, 2014, and claims priority to U.S. patent application Ser. No. 14/074,962, filed Nov. 8, 2013, the entire contents of both of which are hereby incorporated by reference.

FIELD OF THE INVENTION

The invention relates to reforming of hydrocarbons for the preparation of a synthesis gas suitable for the production of ammonia.

BACKGROUND ART

Ammonia plants include a front-end for the generation of a synthesis gas, which is then reacted to form ammonia in a synthesis loop. The synthesis gas is generated in the front-end by steam reforming of a hydrocarbon feedstock, for example natural gas or a substitute natural gas (SNG).

A conventional and well known front-end includes: a primary reformer, a secondary reformer, a shift reactor, a CO2 removal section and optionally a methanation section. The purified synthesis gas leaving the CO2 removal section or methanation section has a molar ratio between hydrogen $H_2$ and nitrogen $N_2$ of around 3:1 suitable for the synthesis of ammonia. Said purified gas is then compressed to synthesis pressure and fed to a synthesis loop.

The primary reformer converts methane from the hydrocarbon source and steam into a gas containing carbon monoxide, carbon dioxide and hydrogen. The secondary reformer provides a further oxidation of said gas, using air as an oxidant. Shift conversion of carbon monoxide to carbon dioxide takes place in an adiabatic high-temperature shift (HTS) reactor operating around 350-500° C. with an iron-based catalyst, and possibly in a further adiabatic low-temperature shift (LTS) reactor. Carbon dioxide is removed for example with a $CO_2$ washing column. Methanation, when provided, removes the residual carbon monoxide by conversion to methane.

In recent years, the need of increase the capacity of existing ammonia plants emerged. Various techniques have been proposed to reach this goal. Most of said techniques rely on a modification of the secondary reformer which is fired with O2-enriched air or pure oxygen, instead of ambient air. However, a drawback of this approach is the need of a large and expensive air-separation unit to produce the required amount of oxygen.

SUMMARY OF THE INVENTION

The present invention discloses a novel way of revamping an ammonia plant and increasing its capacity, according to the attached claims. The invention also relates to a novel process and plant according to the attached claims.

The invention provides that a gaseous feedstock is reformed partly in a train of primary reformer and secondary reformer, or autothermal reformer, and partly in a gas-heated reactor. The heat source of said gas-heated reactor comprises at least part of a product gas effluent from said secondary reformer. Preferably said heat source comprises product gas from said secondary reformer and product gas from the gas-heated reactor itself.

Said gas-heated reactor can be added to an existing front-end in order to increase its capacity. Accordingly, a front-end of an ammonia plant including a primary reformer, a secondary reformer, a shift conversion section, a CO2 removal section and optionally a methanation section can be revamped with a procedure including the installation of a gas-heated reformer after said secondary reformer.

Said gas-heated reformer is basically a shell-and-tube heat exchanger having a tube side and a shell side, and providing a catalytic reforming of a first gas current passing in the tube side and indirect heating of said first gas current by a second current traversing the shell side.

Said first current includes a portion of the available hydrocarbon gaseous feedstock, the remaining portion of said feedstock being directed to said primary reformer, and said second current comprises at least part of the product gas effluent from said secondary reformer.

Said first current is preferably a portion of a mixed flow comprising steam and the hydrocarbon gaseous feedstock. Hence, a portion of said mixed flow is directed to the gas-heated reactor and the remaining portion is directed to the primary reformer. Said mixed flow has preferably a steam-to-carbon ratio of between 2 and 3.5, and more preferably between 2.2 and 3. The steam-to-carbon ratio of the first current can be different from that of the remaining portion directed to the primary reformer.

A pre-reformer can also be provided before the primary reformer, to use lower S/C ratios.

Said second current preferably comprises the effluent of said secondary reformer mixed with the effluent gas leaving the tube side of said gas-heated reformer. Accordingly, the product gas collected from the tubes of said gas-heated reformer is joined with the product gas from the secondary reformer, and the so obtained hot product gas is introduced in the shell side of the gas-heated reformer. In some preferred embodiments, the outlet temperature of the tubes of said gas-heated reformer ranges from 750 to 850° C. and the outlet temperature of said secondary reformer ranges from 950 to 1050° C.

Preferably, said procedure includes also the step of an existing air-fired secondary reformer modified to operate with O2-enriched air. According to some embodiments, said O2-enriched air is obtained by adding an oxygen flow to ambient air, and said oxygen flow is delivered by an air-separation unit. Preferred oxygen concentration in the enriched air is between 25% and 70% molar and more preferably between 30% and 50%.

The procedure may also include the revamping of the existing shift conversion section and/or the revamping of the existing CO2 removal section.

Revamping of the shift conversion section may include one or more of: modification of existing axial-flow shift converters into axial-radial shift converters; adding one or more shift converters in parallel to existing ones; replacing one or more existing adiabatic HTS converters with one or more isothermal MTS converters or revamping to MTS.

An isothermal MTS converter is understood as a shift converter with a copper-based catalyst, for example a Cu—Zn catalyst, working at a medium temperature and comprising a heat exchanger immersed in the catalyst, to remove the heat produced by the exothermic shift conversion. Said medium temperature is for example in the range of 200-300° C.

The technique used for the revamping of the existing CO2 removal section is known in itself and may vary depending on the kind and size of said section, e.g. number and size of columns.

According to a further preferred aspect of the invention, the procedure comprises the installation of a purification section for removal of inert gas. The term inert gas denotes gaseous components which are considered inert to the synthesis of ammonia, for example methane and Argon. Said purification section may include for example a pressure swing adsorption (PSA) unit or a cryogenic unit.

Examples of suitable cryogenic units for said purification and removal of inert gas include nitrogen wash and cryogenic condensation.

Nitrogen wash is carried out with a stream of nitrogen having a suitable high purity, preferably containing not more than 10 ppmv (parts per million in volume) of oxygen. Said nitrogen can be generated by an air separation unit. For example the ASU providing the above mentioned oxygen for air-enrichment can also provide this nitrogen stream.

An example of applicable cryogenic condensation is disclosed in EP2292554.

In all the above cases, the amount of nitrogen added to the synthesis gas is regulated in such a way that the final ratio between hydrogen and nitrogen is around 3:1 as desired.

The procedure may include the revamping of other equipment, e.g. of the main synthesis gas compressor, according to the needs. In some embodiments, the ammonia synthesis loop is also revamped to cope with the increased amount of synthesis gas delivered by the modified front-end.

Thanks to the addition of the gas-heated reformer, a considerable increase of capacity is obtained without an expensive revamping of the primary reformer, and with a relatively small amount of oxygen for the secondary reformer. Hence, the size and cost of the air separation unit are less than in prior-art solutions. The use of O2-enriched air has the advantage that less nitrogen is introduced with the oxidant and then the ratio of volumetric flow rate over capacity (amount of synthesis gas produced) is more favorable.

This means that not all the nitrogen necessary for the production of ammonia is introduced in the secondary reformer, as in the background art. A relevant portion of said nitrogen is introduced in the final purification step or after said purification step, depending on the purification technique (e.g. nitrogen wash or PSA). The advantage of this practice is to reduce the flow of gas in the front end of the plant, allowing more space for the capacity increase.

In some embodiments of the invention, the capacity, in terms of the amount of synthesis gas that can be produced by the front-end, is increased by 50% and more. In some cases the capacity increases by 100% i.e. the capacity of the revamped plant is twice the original one.

BRIEF DESCRIPTION OF THE DRAWINGS

FIGS. 2 to 5 illustrate some embodiments of the invention concerning purification of the raw synthesis gas.

DETAILED DESCRIPTION OF PREFERRED EMBODIMENTS

Figure 1:
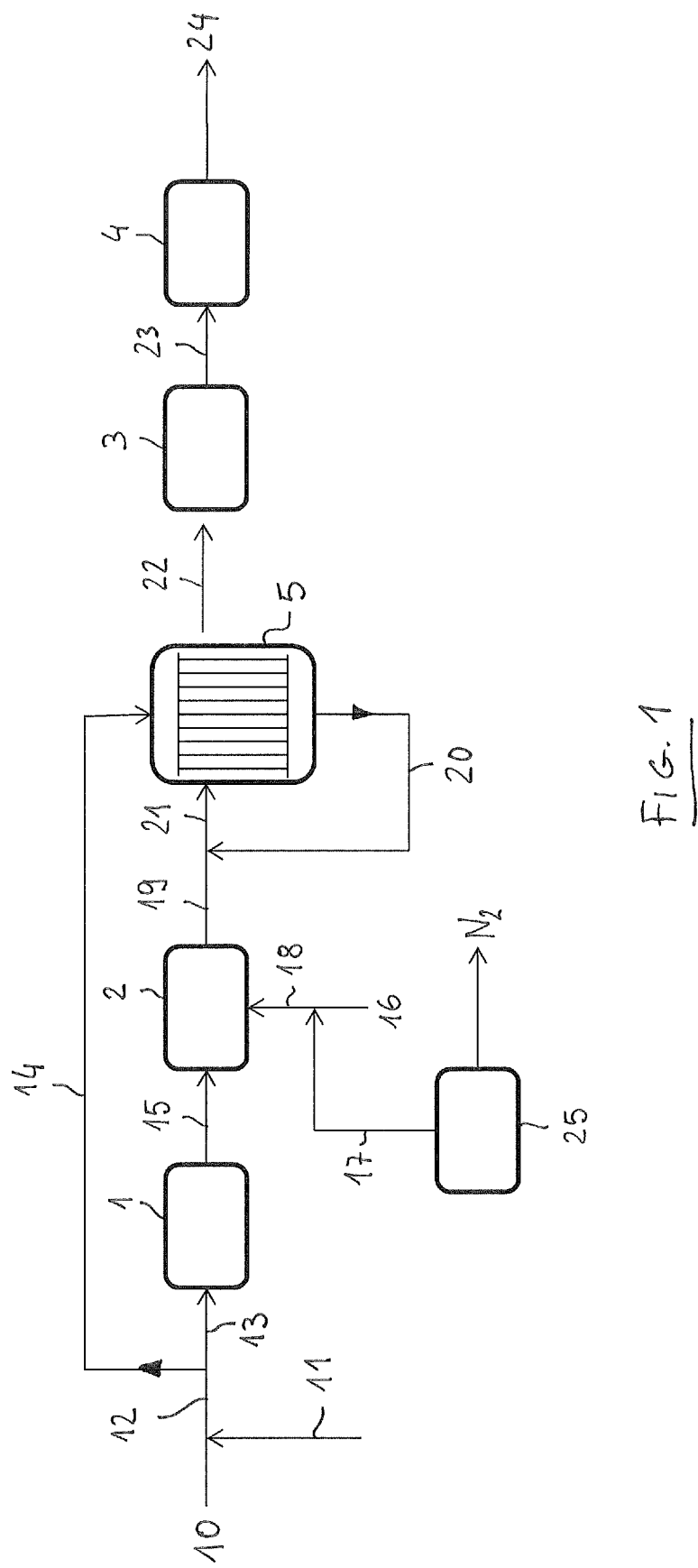
FIG. 1 is a scheme of a front-end of an ammonia plant according to the invention.

FIG. 1 illustrates a front-end of an ammonia plant including a tube primary reformer 1, a secondary reformer 2, a shift conversion section 3, a CO2 removal section 4, and a gas-heated reactor (GHR) 5 after the secondary reformer 2, and before the shift conversion section 3.

Said gas-heated reactor 5 is basically a shell-and-tube equipment for indirect heat exchange between a first current in the tube side and a second current in the shell side. Said first current contains a gaseous hydrocarbon and steam. Said tubes of reactor 5 are filled or coated with a suitable catalyst for steam reforming.

A gaseous hydrocarbon feedstock, for example desulphurized natural gas 10, is added with steam 11 forming a mixed flow 12. A first part 13 of said mixed flow 12 is directed to the tubes of the primary reformer 1, and the remaining part 14 of said mixed flow 12 is fed to the tube side of the gas-heated reactor 5. Further steam can be added to stream 14, according to some embodiments.

The first part 13 of mixed steam and methane flow 12 is reformed in the primary reformer 1, obtaining a partial conversion of methane contained therein, and the effluent 15 is further converted in the secondary reformer 2 with oxygen-enriched air 18. Said oxygen-enriched air 18 is obtained by adding a suitable amount of oxygen 17 to ambient air 16. The oxygen 17 may be provided for example by an air-separation unit 25. Preferably said oxygen-enriched air 18 contains 25% to 50% of oxygen. Said air-separation unit 25 may also deliver a current of nitrogen of a high purity for a further use in the process, as illustrated for example in the FIGS. 2 to 5.

Referring again to FIG. 1, the second part 14 of said flow 12 is reformed in the tubes of said gas-heated reactor 5. Here, the heat input to the reforming process is provided by the current 21 of hot product gas which traverses the shell side of the gas-heated reactor 5. Said current 21 comprises the product gas 19 from the secondary reformer 2 and also the product gas 20 leaving the tube-side of gas-heated reactor 5, which is joined with said product gas 19 as illustrated.

Hence it can be said that the gas-heated reactor 5 operates in parallel to the train of primary reformer 1 and secondary reformer 2. Part of the available mixed flow 12 is converted through the reformers 1 and 2 to the first product gas 19, while another part is converted through the gas-heated reactor 5 to the second product gas 20.

Preferably the first part 13 is more than 50% of the flow 12. In a preferred embodiment, the first part 13 is around 70% and the second part 14 is around 30% of the total amount of mixed flow 12. This ratio however may vary.

After a passage in the shell side of the gas-heated reactor 5, said hot current 21, now cooled to 22, is fed to the shift conversion section 3.

The effluent 23 of said shift conversion section 3 is treated in the CO2-removal section 4.

The CO2-depleted stream 24 is preferably purified for example by removing residual methane and other inert gaseous components (e.g. Argon) before it is fed to an ammonia synthesis loop.

FIGS. 2 to 5 illustrate some of the possible embodiments for the purification of said stream 24.

According to FIG. 2, the CO2-depleted gas 24 is purified in a PSA section 26 and in a methanation section 27. Then the purified gas 28 is compressed in a compression section 29 and sent to a synthesis loop 30. The PSA may also be installed downstream the methanation section in a variant embodiment.

A suitable amount of nitrogen is added via line 31 to the stream effluent from the PSA section 26. Said nitrogen 31 may come from the same ASU 25 which generates the oxygen 17 (FIG. 1).

FIG. 3 illustrates a variant where said CO2-depleted gas 24 is purified in a nitrogen wash section 33, optionally after a methanation section 27. The necessary nitrogen 34 may be provided by the ASU 25 as above.

FIG. 4 illustrates an embodiment where purification of said CO2-depleted gas 24 includes a cryogenic condensation in a suitable unit 35, after a first step of purification in a methanation section 27. A suitable amount of nitrogen 36 is added to the gas before it enters said cryogenic condensation unit 35.

FIG. 5 illustrates a variant of FIG. 4 which includes a first compression section 29A before the cryogenic condensation unit 35, and a second compression section 29B after said unit 35. The first compression section 29A provides an initial compression and the second compression section 29B provides final compression after the purification in the cryogenic unit 35. The nitrogen 36 is preferably added to the gas stream after the initial compression and before it enters the cryogenic condensation unit 35.

In the above embodiments, the amount of nitrogen via lines 31 or 34 or 36 is regulated in such a way that the purified product gas 30 contains the desired concentration of nitrogen for ammonia synthesis.

Thanks to the reforming in parallel through the reformer 1 and gas-heated reactor 5, a front-end as illustrated in FIG. 1 is able to convert a greater amount of natural gas 10, i.e. it has a greater capacity, compared to a conventional front-end.

According to some embodiments, the gas-heated reactor 5 is added during a revamping procedure of the front-end originally comprising the reformers 1, 2 and sections 3, 4. The other equipment, in particular the shift conversion section 3 and CO2 removal section 4, can also be revamped.

The invention claimed is:

1. A procedure for revamping a front-end of an ammonia plant, said front-end being arranged to produce ammonia synthesis gas containing hydrogen and nitrogen by steam reforming of a hydrocarbon gaseous feedstock, said front-end including a primary reformer, a secondary reformer, a shift conversion section, and a $CO_2$ removal section, said procedure including at least:
   installation of a gas-heated reformer after said secondary reformer, said gas-heated reformer being a shell-and-tube heat exchanger having a tube side and a shell side, and providing a catalytic reforming of a first gas current passing in the tube side and indirect heating of said first gas current by a second current traversing the shell side, said first current including a portion of the available hydrocarbon feedstock, the remaining portion of said feedstock being directed to said primary reformer, and said second current comprising at least a portion of a product gas effluent from said secondary reformer,
   said secondary reformer being an air-fired secondary reformer, and the procedure including the step of modifying said secondary reformer to operate with $O_2$-enriched air, and
   wherein said front-end includes a methanation section and said procedure provides for the addition of nitrogen to a product gas flowing in said methanation section or to a product gas effluent from said methanation section, or wherein the procedure provides for the installation of a final purification section after said $CO_2$ removal section, for the removal of inert gases from $CO_2$-depleted product gas effluent from said $CO_2$ removal section, and nitrogen is added to a product gas flowing in said final purification section or to a product gas effluent from said final purification section.

2. The procedure of claim 1, wherein said first current is a portion of a mixed flow comprising steam and the available hydrocarbon feedstock, which is redirected to said gas-heated reactor while the remaining portion is directed to said primary reformer.

3. The procedure of claim 2, said mixed flow having a steam-to-carbon ratio of between 2 and 3.5.

4. The procedure of claim 1, said second current comprising product gas effluent from said secondary reformer or autothermal reformer, and also comprising product gas leaving said tube side of said gas-heated reformer.

5. The procedure of claim 1, said O2-enriched air being obtained by adding an oxygen flow to ambient air.

6. The procedure of claim 5, said oxygen flow being in an amount to provide a molar concentration of oxygen in the enriched air between 25% and 70%.

7. The procedure of claim 5, said oxygen flow being delivered by an air-separation unit.

8. The procedure of claim 7, further comprising the provision and the installation of said air-separation unit.

9. The procedure of claim 1, further including the revamping of said shift conversion section and/or the revamping of said $CO_2$ removal section.

10. The procedure of claim 9, including the revamping of said shift conversion section by means of one or more of the following: the conversion of one or more existing axial-flow shift converters into axial-radial shift converters; adding one or more shift converters in parallel to the existing ones; replacing one or more existing adiabatic high-temperature shift converters with one or more isothermal medium-temperature shift converters.

11. The procedure of claim 10, including the provision of one or more isothermal medium-temperature shift converters or the modification of one or more existing shift converters to operate as medium shift converters, wherein said medium-temperature shift converters include a copper-based catalyst, and comprise a heat exchanger immersed in the catalyst, to remove the heat produced by the exothermic shift conversion.

12. The procedure of claim 11, said medium temperature being in the range of 200-300° C.

13. The procedure of claim 1, said purification section including a methanation section.

14. The procedure of claim 1, said purification section including a nitrogen wash section or a cryogenic condensation section for condensation of nitrogen and inerts, or a PSA unit.

15. The procedure of claim 14, said purification section including a nitrogen wash section or a cryogenic condensation section, said procedure including the provision of a nitrogen line for addition of nitrogen before or into said nitrogen wash section or said cryogenic condensation section, and said nitrogen being in an amount suitable to obtain a purified synthesis gas containing hydrogen and nitrogen in a molar ratio around 3 to 1.

16. A process for producing ammonia synthesis gas containing hydrogen and nitrogen by steam reforming of a hydrocarbon gaseous feedstock, including:
   mixing said hydrocarbon gaseous feedstock with steam,
   reforming a first portion of the so obtained mixed flow of gaseous feedstock and steam in a primary reformer and then in a secondary reformer or in an autothermal reformer, obtaining a first product gas,
   reforming a second portion of said mixed flow in a gas-heated reactor, obtaining a second product gas,
   said gas-heated reactor being heated by a current of product gas comprising at least a portion said first product gas, wherein:

said secondary reformer operates with $O_2$-enriched air, and nitrogen is added to a product gas flowing in a final purification step or to a product gas effluent from said final purification step.

17. The process of claim 16, said secondary reformer or autothermal reformer operating with $O_2$-enriched air having a concentration of oxygen between 25% and 70% molar.

18. The process of claim 16, further comprising the treatment of product gas comprising: shift conversion, removal of carbon dioxide, and purification of $CO_2$-depleted product gas after said removal of carbon dioxide, and said purification including at least one of the following: a methanation process; nitrogen wash; cryogenic condensation; pressure-swing adsorption (PSA).

* * * * *